US008035585B2

(12) United States Patent  
Nichols et al.

(10) Patent No.: US 8,035,585 B2  
(45) Date of Patent: Oct. 11, 2011

(54) GRAPHIC DATA FILES INCLUDING ILLUMINATION CONTROL AND RELATED METHODS AND COMPUTER PROGRAM PRODUCTS

(75) Inventors: Paul H. Nichols, Raleigh, NC (US); Kamal A. Khan, Durham, NC (US); Iman G. Ali, Apex, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1967 days.

(21) Appl. No.: 11/016,073

(22) Filed: Dec. 17, 2004

(65) Prior Publication Data

US 2006/0132384 A1    Jun. 22, 2006

(51) Int. Cl.
*G09G 3/30* (2006.01)
(52) U.S. Cl. ........ 345/77; 345/204; 340/815.4; 455/566
(58) Field of Classification Search .................. 345/104, 345/474, 629, 33, 39, 170, 36, 77, 82, 87, 345/102, 204, 426, 428, 473; 707/104.1; 715/788; 359/443; 348/333.03, 333.05; 340/815.4; 455/566; 258/88
See application file for complete search history.

(56) References Cited

U.S. PATENT DOCUMENTS

| | | | |
|---|---|---|---|
| 5,581,674 A * | 12/1996 | Itoh ............................ | 345/606 |
| 6,392,652 B1 | 5/2002 | Cronin et al. | |
| 6,714,200 B1 | 3/2004 | Talnykin et al. | |
| 6,714,202 B2 | 3/2004 | Dorrell | |
| 6,796,690 B2 * | 9/2004 | Bohlander ................. | 362/471 |

(Continued)

FOREIGN PATENT DOCUMENTS

EP    1 152 442    11/2001

(Continued)

OTHER PUBLICATIONS

PCT International Search Report for PCT/US2005/021223 dated Apr. 6, 2006.

(Continued)

*Primary Examiner* — Abbas Abdulselam
(74) *Attorney, Agent, or Firm* — Myers Bigel Sibley & Sajovec, P.A.

(57) ABSTRACT

An electronic device may include a screen and a plurality of lights. A plurality of image frames may be provided with each image frame defining an image for display on the screen. Illumination instructions may be provided for the plurality of lights, wherein different illumination instructions are associated with different image frames and wherein each illumination instruction defines a respective illumination pattern for the plurality of lights. The images defined by the respective image frames may be displayed on the screen. While displaying a first image defined by a first image frame on the screen, a first illumination pattern for the plurality of lights may be provided with the first illumination pattern being defined by a first illumination instruction associated with the first image frame. While displaying a second image defined by a second image frame on the screen, a second illumination pattern for the plurality of lights may be provided with the second illumination pattern being defined by a second illumination instruction associated with the second image frame. Moreover, the first and second illumination patterns may be different. Related methods and computer program products are also discussed.

34 Claims, 10 Drawing Sheets

U.S. PATENT DOCUMENTS

| | | | |
|---|---|---|---|
| 6,897,787 B2 * | 5/2005 | Colorado et al. | 340/815.4 |
| 6,957,389 B2 * | 10/2005 | Faraday et al. | 715/731 |
| 7,145,558 B2 * | 12/2006 | Ong | 345/204 |
| 7,305,075 B2 * | 12/2007 | Harris | 379/142.01 |
| 2004/0204014 A1 | 10/2004 | Colorado | |

FOREIGN PATENT DOCUMENTS

| | | |
|---|---|---|
| EP | 1 255 418 | 11/2002 |
| JP | 2000-122615 | 4/2000 |
| JP | 2002-33802 | 1/2002 |
| JP | 2002-300235 | 10/2002 |
| JP | 2003-062268 | 3/2003 |
| JP | 2003062268 | 3/2003 |
| JP | 2003091230 | 3/2003 |
| WO | WO03/103316 | 12/2003 |
| WO | WO 2004/019583 | 3/2004 |

OTHER PUBLICATIONS

Graphics Interchange Format; http://www.acro.it/Acro-3F504B3D353436.html Jun. 3, 2003.

GIF; http://searchwebservices.techtarget.com/sDefinition/0..sid26_gci213984,00.html Jul. 13, 2002.

GIF89a Specification; http://www.w3.org/Graphics/GIF/spec-gif89a.txt 1990.

First Office Action corresponding to Japanese Patent Application No. 2007-546628 dated Nov. 12, 2010; 3 pages.

Office Action corresponding to Japanese Patent Application No. 2007-546628 dated Jul. 8, 2011; 2 pages.

First Office Action corresponding to Japanese Patent Application No. 2007-546628 dated Nov. 12, 2010; 3 pages.

* cited by examiner

| Field | Size | Description |
|---|---|---|
| GIF Block Code | 1 byte | Must be 0x21 for extension block |
| Extension Type Code | 1 byte | Must be 0xFF for application extension |
| Block Size | 1 byte | Must be 0x0B for the 11 byte length (8+3) |
| Application ID | 8 bytes | Identifies the extension. ASCII string "SEMC LED" or 0x53, 0x45, 0x4D, 0x43, 0x20, 0x4C, 0x45, 0x44 |
| Authentication Code | 3 bytes | The version number. ASCII string "1.0" or 0x31, 0x2E, 0x30. |
| Extension Block Size | 1 byte | Size of data block in bytes. Will always be a multiple of 2. |
| Illumination Command | 1 byte | An illumination command. See description below. |
| Illumination Identifier | 1 byte | Command specific identifier. See description below. |
| Block Terminator | 1 byte | Must be 0x00 to terminate the extension block. |

FIGURE 3

| Illumination Command | | Light Commands |
|---|---|---|
| Hex | Binary | |
| 0x00 | 0000 0000 | *Turn off* the light specified by the illumination identifier. |
| 0x01 | 0000 0001 | *Turn on* the light specified by the illumination identifier. |
| 0x02 | 0000 0010 | *Fade off* the light specified by the illumination identifier. If the light is already off, the result will be no change to the light. |
| 0x03 | 0000 0011 | *Fade on* the light specified by the illumination identifier. If the light is already on, this result will be no change to the light. |
| 0x04 | 0000 0100 | *Flash* the light specified by the illumination identifier. The light will fade on and then fade off in one smooth and continuous operation. If the light is already on, the result will be to only fade off. |
| 0x05 | 0000 0101 | *Blink* the light specified by the illumination identifier. The light will fade off and then fade on in one smooth and continuous operation. If the light is already off, the result will be to only fade on. |

FIGURE 4

| Acronym for Light ID | Value (Dec) | Value (Hex) | Description |
|---|---|---|---|
| Key Pad Identifiers ||||
| KEY_0 | 0 | 0x00 | Light only the "0" key. |
| KEY_1 | 1 | 0x01 | Light only the "1" key. |
| KEY_2 | 2 | 0x02 | Light only the "2" key. |
| KEY_3 | 3 | 0x03 | Light only the "3" key. |
| KEY_4 | 4 | 0x04 | Light only the "4" key. |
| KEY_5 | 5 | 0x05 | Light only the "5" key. |
| KEY_6 | 6 | 0x06 | Light only the "6" key. |
| KEY_7 | 7 | 0x07 | Light only the "7" key. |
| KEY_8 | 8 | 0x08 | Light only the "8" key. |
| KEY_9 | 9 | 0x09 | Light only the "9" key. |
| KEY_STAR | 10 | 0x0A | Light only the "*" key. |
| KEY_NUM | 11 | 0x0B | Light only the "#" key. |
| KEY_UP | 12 | 0x0C | Light only the up directional key. |
| KEY_DOWN | 13 | 0x0D | Light only the down directional key. |
| KEY_LEFT | 14 | 0x0E | Light only the left directional key. |
| KEY_RIGHT | 15 | 0x0F | Light only the right directional key. |
| KEY_SOFT_LEFT | 16 | 0x10 | Light only the left soft key. |
| KEY_SOFT_RIGHT | 17 | 0x11 | Light only the right soft key. |
| KEY_SOFT_CENTER | 18 | 0x12 | Light only the center soft key. |
| KEY_POWER | 19 | 0x13 | Light only the power key. |
| KEY_NETWORK | 20 | 0x14 | Light only the network (web) access key. |
| KEY_BACK | 21 | 0x15 | Light only the back key. |
| KEY_CLEAR | 22 | 0x16 | Light only the clear key. |
| KEY_VOL_UP | 23 | 0x17 | Light only the volume up key. |
| KEY_VOL_DOWN | 24 | 0x18 | Light only the volume down key. |
| KEY_CAMERA | 25 | 0x19 | Light only the camera button (key). |

FIGURE 5A

| | | | |
|---|---|---|---|
| KEY_SELECT | 26 | 0x1A | Light only the select key. |
| KEY_TALK | 27 | 0x1B | Light only the talk key. |
| KEY_END | 28 | 0x1C | Light only the end key. |
| KEY_MENU | 29 | 0x1D | Light only the menu key. |
| KEY_OTHER_1 | 30 | 0x1E | Light only this phone specific key. |
| KEY_OTHER_2 | 31 | 0x1F | Light only this phone specific key. |
| Note: If a device does not have a key on it's keypad or if the key can not be individually illuminated then any commands that use the corresponding KEY_XXX light ID will be ignored. | | | |
| Peripheral Light Identifiers | | | |
| PERIPHERAL_0 | 32 | 0x20 | A single light on the peripheral of the device. Or, multiple lights if they can not be individually controlled. Mappling of lights to IDs is device specific. A device that has only N peripheral lights should use the first N IDs. For example, 8 lights would use IDs 0 through 7. |
| ... | | | |
| PERIPHERAL_31 | 63 | 0x3F | |
| Peripheral Clock Position Identifiers | | | |
| PERIPH_1_OCLOCK | 64 | 0x40 | Control one or more peripheral lights to represent the position of the hour hand on a 12-hour clock. |
| ... | | | |
| PERIPH_12_OCLOCK | 75 | 0x4B | |
| RESERVED | | 0x4C..0x4F | Future use. |
| Multiple Keypad Lights | | | |
| KEYPAD_ROW_0 | 80 | 0x50 | Starting at the bottom on the keypad and working up. Refers to a row of lights. For example, KEY_1, KEY_2 and KEY_3 might make a row of lights. A particular phone might only support 4 rows of lights on the keypad. In which case only ROW_0 through ROW_3 would be used. |
| ... | | | |
| KEYPAD_ROW_15 | 95 | 0x5F | |
| KEYPAD_CLMN_0 | 96 | 0x60 | Starting from the left and working towards the right. Refers to a column of lights on the keypad. |
| ... | | | |
| KEYPAD_CLMN_15 | 111 | 0x6F | |
| Specialty Device Lights | | | |
| LIGHT_DISPLAY_0 | 112 | 0x70 | Backlight for primary display |
| LIGHT_DISPLAY_1 | 113 | 0x71 | Backlight for secondary display (ifsupported and independent from the backlight for the primary display). |
| | 114 | 0x72 | Reserved for future use. |
| | 115 | 0x73 | Reserved for future use. |
| LIGHT_CAMERA | 116 | 0x74 | Turn on the camera light. |
| Multiple Device Lights | | | |
| ALL | 120 | 0x78 | All lights. Includes all display, camera, keypad and peripheral lights |
| ALL_KEYPAD | 121 | 0x79 | Refers to all keypad lights. Does not include display, camera or Peripheral lights. |
| ALL_PERIPHERAL | 122 | 0x7A | Refers to all peripheral lights. Does not include display, camera or keypad lights. |

FIGURE 5B

| Illumination Command | | Sequence Commands |
| --- | --- | --- |
| Hex | Binary | |
| 0x10 | 0001 0000 | *Loop* (repeatedly play) the pre-defined sequence specified by the illumination identifier. |
| 0x11 | 0001 0001 | *Play* the pre-defined sequence specified by the illumination identifier. The sequence is played one time. |
| | 0001 NNNN | *Play* the pre-defined sequence specified by the illumination identifier. The sequence is repeated NNNN times. |

Note: All command values that are not specified above are reserved for future use and must be ignored.
Note: If the phone or device does not support the identified light or sequence then the command is ignored.

FIGURE 6

| Acronym for Sequence ID | Value (Hex) | Description |
|---|---|---|
| SEQ_RING_AROUND_ROSIE | 0x00 | A light goes around the keypad ring in a circular motion |
| SEQ_KNIGHT_RIDER | 0x01 | a "knight rider" light goes up and down the keypad ring |
| SEQ_ALL_FLASH | 0x02 | All the lights in the keypad ring flash on/off at the same time |
| SEQ_RANDOM | 0x03 | Random flashing lights |
| SEQ_RANDOM_FADE | 0x04 | Random fading lights |
| SEQ_EQUALIZER | 0x05 | Bouncing lights (like an equalizer) |
| SEQ_EVEN_ODD | 0x06 | Evens flash, Odd flash. Even flash, etc. |
| SEQ_WINK_AROUND | 0x07 | All lights around the ring lit up. A dark light appears to travel around the keypad ring. |
| SEQ_LANDING_STRIP | 0x08 | Lights mimic a landing strip. |
| SEQ_HEARTBEAT | 0x09 | Lights mimic a beating heart (light up quickly two times followed by delay, etc.) |
| SEQ_SOS | 0x0A | Morse code for SOS |
| SEQ_ALT_LEFT_RIGHT | 0x0B | Lights alternate between left and right side of phone |
| SEQ_ALL_ON | 0x0C | Turn all the lights on. No "motion" in this sequence" |
| SEQ_ALL_OFF | 0x0D | Turn all the lights off. No "motion" in this sequence. |
| | 0x0E..0x7F | Reserved for pre-defined, standard sequences. |
| DEVICE SPECIFIC 0 | 0x30..0xFF | Reserved for device-specific sequences |
| DEVICE SPECIFIC 1 | | |

FIGURE 7

GRAPHIC DATA FILES INCLUDING ILLUMINATION CONTROL AND RELATED METHODS AND COMPUTER PROGRAM PRODUCTS

BACKGROUND OF THE INVENTION

The present invention relates to the field of data files, and more particularly, to image data files and related display methods.

Multi-layer (or multi-page) images can be thought of as a set of images, all typically but not necessarily the same size, which are combined for the purpose of displaying on an output display device. Thus, multi-layer refers to multiple images in a single file. Each image in the file may be referred to as a layer. Multi-layer images may be used for image editing, graphic design, and/or animation (such as animation in web pages on the Internet). As will be known to those having skill in the art, the Graphics Interchange Format (GIF) is widely used as a file format for animation. The Graphics Interchange Format is discussed, for example, in U.S. Pat. No. 6,714,202.

The GIF standard includes layers (or multiple images) which may be provided in sequence order. Each layer of a GIF file may be of different size and may be positioned using offset coordinates to improve storage efficiency in cases where only small areas contain changes from one layer to the next. The GIF standard defines a virtual screen upon which each layer is composed. The GIF standard generally uses a control block structure to indicate how the layers in the file are to be displayed. Each layer of the file format may be preceded by a control block, which may include: information about the location of the top left corner in the virtual screen, information on how long the layer should be displayed before proceeding to the next layer in the file; and whether the layer should be removed prior to display of a next layer in the file. This control block based structure may allow for relatively simple software implementation of the decoder. In fact little additional coding may be required to implement a GIF decoder capable of correctly displaying multi-layer animated GIF images.

The GIF standard is further discussed in the GIF specification entitled "GRAPHICS INTERCHANGE FORMAT (sm)", Version 89a, Jul. 31, 1990, pages 1-34.

SUMMARY OF THE INVENTION

According, to some embodiments of the present invention, methods may be provided for operating an electronic device including a screen and a plurality of lights. The method may include providing a plurality of image frames with each image frame defining an image for display on the screen, and providing illumination instructions for the plurality of lights wherein different illumination instructions are associated with different image frames and wherein each illumination instruction defines a respective illumination pattern for the plurality of lights. The images defined by the respective image frames may be displayed on the screen. While displaying a first image defined by a first image frame on the screen, a first illumination pattern for the plurality of lights may be provided with the first illumination pattern being defined by a first illumination instruction associated with the first image frame. While displaying a second image defined by a second image frame on the screen, a second illumination pattern for the plurality of lights may be provided with the second illumination pattern being defined by a second illumination instruction associated with the second image frame. Moreover, the first and second illumination patterns may be different.

Providing the plurality of image frames and providing the illumination instructions may include providing a graphic data file including the plurality of image frames and the associated illumination instructions. Moreover, each image frame may be provided as a different image data block of the graphic data file, and each illumination instruction may be provided as an illumination data block of the graphic data file with each illumination data block being associated with a different image data block. Providing the graphic data file may also include providing a plurality of control data blocks with each of the control data blocks being associated with a respective one of the image data blocks and defining a duration for display of the image defined by the respective image data block. In addition, providing the graphic data file may include providing the graphic data file according to the Graphics Interchange Format (GIF) standard.

In other embodiments of the present invention, providing the plurality of image frames and providing the plurality of illumination instructions may include providing a first graphic data file including a first image frame and a first illumination instruction, and providing a second graphic data file including a second image frame and a second illumination instruction. The screen may include a liquid crystal display, and the plurality of lights may include a plurality of light emitting diodes. In addition, the plurality of lights may include at least one of a backlight for a keypad, a peripheral light outside a keypad, and/or a backlight for the liquid crystal display.

The images may be displayed in sequence to provide animation. With the first illumination pattern, at least one of the lights may be on while displaying the first image, and with the second illumination pattern, the at least one light may be off while displaying the second image, for example, to provide different static illumination patterns associated with different images. In other embodiments of the present invention, with the first illumination pattern, at least two of the lights may be turned on and/or off according to a first sequence while displaying the first image, and with the second illumination pattern, at least two of the lights may be turned on and/or off according to a second sequence while displaying the second image, with the first and second sequences being different, for example, to provide different dynamic illumination patterns. In addition, providing the plurality of image frames may include receiving the plurality of image frames over a wireless interface, and providing the illumination instructions may include receiving the illumination instructions over the wireless interface.

According to additional embodiments of the present invention, an electronic device may include a screen, a plurality of lights, a memory, and a processor coupled to the screen, the plurality of lights, and the memory. The memory may be configured to provide a plurality of image frames with each image frame defining an image for display on the screen. The memory may also be configured to provide illumination instructions for the plurality of lights wherein different illumination instructions are associated with different image frames and wherein each illumination instruction defines a respective illumination pattern for the plurality of lights. The processor may be configured to display the images defined by the respective image frames on the screen. While displaying a first image defined by a first image frame on the screen, the processor may be configured to provide a first illumination pattern for the plurality of lights with the first illumination pattern being defined by a first illumination instruction associated with the first image frame. While displaying a second image defined by a second image frame on the screen, the processor may be configured to provide a second illumination pattern for the plurality of lights with the second illumination pattern being defined by a second illumination instruction associated with the second image frame. Moreover, the first and second illumination patterns may be different.

The memory may be further configured to provide a graphic data file including the plurality of image frames and the associated illumination instructions. More particularly, each image frame may be provided as a different image data block of the graphic data file, and each illumination instruction may be provided as all illumination data block of the graphic data file with each illumination data block being associated with a different image data block. The graphic data file may also include a plurality of control data blocks with each of the control data blocks being associated with a respective one of the image data blocks and defining a duration for display of the image defined by the respective image data block. Moreover, the graphic data file may be provided according to the Graphics Interchange Format (GIF) standard.

In other embodiments of the present invention, the memory may be configured to provide a first graphic data file including a first image frame and a first illumination instruction, and to provide a second graphic data file including a second image frame and a second illumination instruction. Moreover, the screen may be a liquid crystal display, and the plurality of lights may be a plurality of light emitting diodes. More particularly, the plurality of lights may include at least one of a backlight for a keypad, a peripheral light outside a keypad, and/or a backlight for the liquid crystal display, and the processor may be configured to display the images in sequence to provide animation.

With the first illumination pattern, at least one of the lights may be on while displaying the first image, and with the second illumination pattern, the at least one light may be off while displaying the second image, for example, to provide different static illumination patterns associated with different images. In other embodiments of the present invention, with the first illumination pattern, at least two of the lights may be turned on and/or off according to a first sequence while displaying the first image, and with the second illumination pattern at least two of the lights may be turned on and/or off according to a second sequence while displaying the second image with the first and second sequences being different, for example, to provide different dynamic illumination patterns associated with different images. In addition, a receiver may be coupled to the memory and/or the processor with the receiver being configured to receive the plurality of image frames and the illumination instructions over a wireless interface and to provide the plurality of image frames and the illumination instructions to the memory and/or the processor.

According to still additional embodiments of the present invention, computer program products may be provided for operating an electronic device including a screen and a plurality of lights. The computer program products may include a computer readable storage medium having computer readable program code embodied therein. The computer readable program code may include computer readable program code configured to provide a plurality of image frames with each image frame defining an image for display on the screen. Computer readable program code may also be configured to provide illumination instructions for the plurality of lights wherein different illumination instructions are associated with different image frames and wherein each illumination instruction defines a respective illumination pattern for the plurality of lights. In addition, computer readable program code may be configured to display the images defined by the respective image frames. Moreover, computer readable program code may be configured to provide a first illumination pattern for the plurality of lights while displaying a first image defined by a first image frame on the screen with the first illumination pattern being defined by a first illumination instruction associated with the first image frame. In addition, computer readable program code may be configured to provide a second illumination pattern for the plurality of lights while displaying a second image defined by a second image frame on the screen with the second illumination pattern being defined by a second illumination instruction associated with the second image frame. More particularly, the first and second illumination patterns may be different.

The computer readable program code configured to provide a plurality of image frames and the computer readable program code configured to provide illumination instructions together include computer readable program code configured to provide a graphic data file including the plurality of image frames and the associated illumination instructions. Each image frame may be provided as a different image data block of the graphic data file and each illumination instruction may be provided as an illumination data block of the graphic data file with each illumination data block being associated with a different image data block. The computer readable program code configured to provide the graphic data file may be further configured to provide a plurality of control data blocks with each of the control data blocks being associated with a respective one of the image data blocks and defining a duration for display of the image defined by the respective image data block. In addition, the computer readable program code configured to provide the graphic data file may be further configured to provide the graphic data file according to the Graphics interchange Format (GIF) standard.

The screen may include a liquid crystal display, and the plurality of lights may include a plurality of light emitting diodes. Moreover, the plurality of lights may include at least one of a backlight for a keypad, a peripheral light outside a keypad, and/or a backlight for the liquid crystal display, and the images may be displayed in sequence to provide animation. More particularly, with the first illumination pattern, at least one of the lights may be on while displaying the first image, and with the second illumination pattern, the at least one light may be off while displaying the second image, for example, to provide different static illumination patterns associated with different images. In other embodiments of the present invention, with the first illumination pattern, at least two of the lights may be turned on and/or off according to a first sequence while displaying the first image, and with the second illumination pattern, at least two of the lights may be turned on and/or off according to a second sequence while displaying the second image with the first and second sequences may be different, for example, to provide different dynamic illumination patterns associated with different images.

BRIEF DESCRIPTION OF THE DRAWINGS

FIG. 3 is a table illustrating structures of illumination data blocks according to some embodiments of the present invention.

FIG. 4 is a table illustrating static illumination commands according to some embodiments of the present invention.

FIG. 5A-B are tables illustrating static illumination identifiers according to some embodiments of the present invention.

FIG. 6 is a table illustrating dynamic illumination commands according to some embodiments of the present invention.

FIG. 7 is a table illustrating dynamic illumination identifiers according to some embodiments of the present invention.

DETAILED DESCRIPTION

Figure 1A:
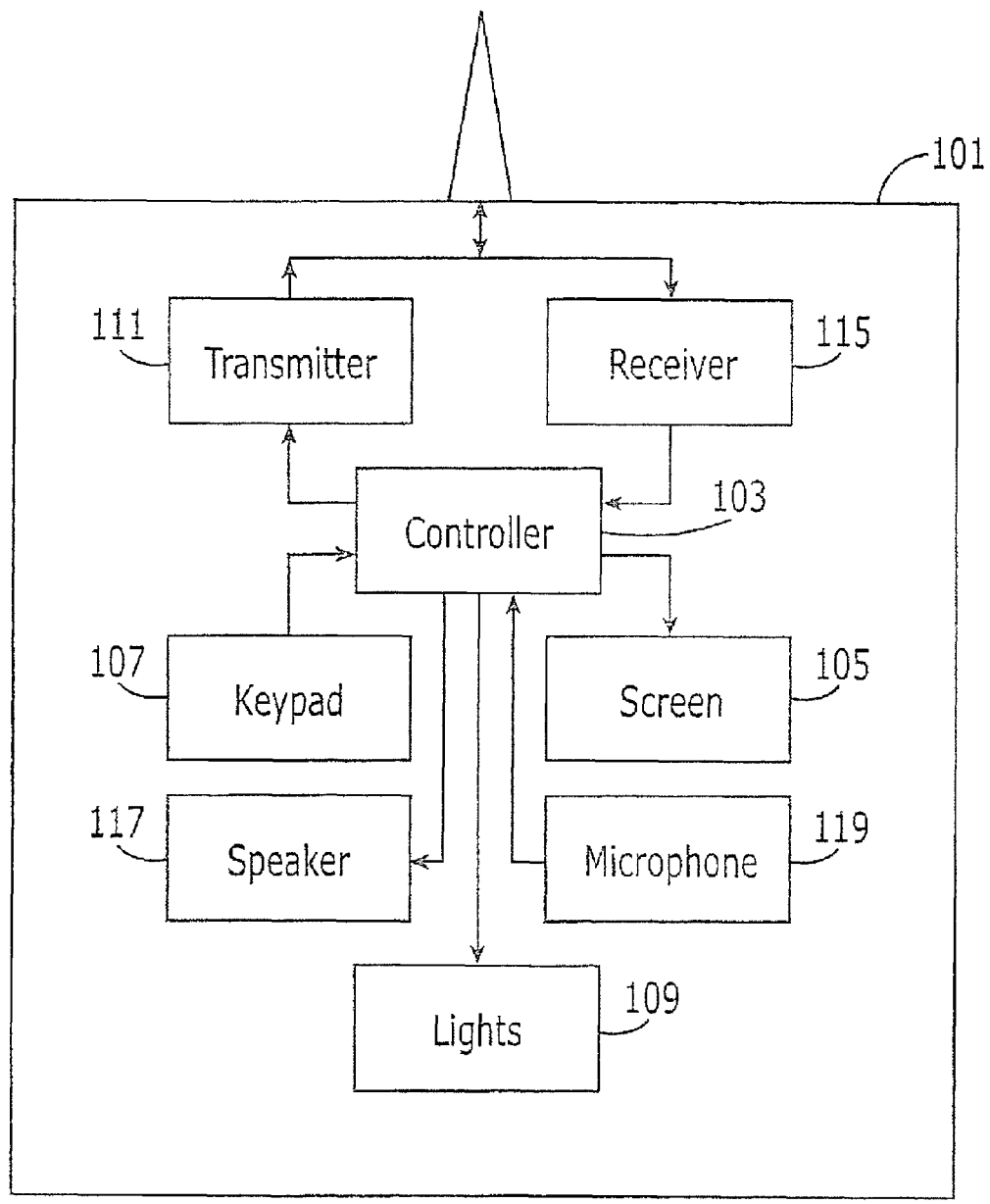
FIG. 1A is a block diagram illustrating an electronic device according to some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described herein with reference to flowchart and/or block diagram illustrations of methods, systems, and computer program products in accordance with various embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the operation and/or function spec lied in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the operations and/or functions specified in the flowchart and/or block diagram block or blocks.

FIG. 1A is a block diagram illustrating an electronic device according to some embodiments of the present invention. As shown in FIG. 1, the electronic device 101 may include a controller 103, a screen 105, a keypad 107, a plurality of lights 109 such as light emitting diodes (LEDs), a transmitter 111, a receiver 115, a speaker 117, and a microphone 119. Moreover, the controller 103 may include one or more processors and memories. According to particular embodiments, the electronic device 101 may be a wireless communications device and/or a mobile terminal such as radiotelephone. As used herein, the term "wireless communication device" or "mobile terminal" includes: a cellular radiotelephone with or without a multi-line display; a Personal Communications System (PCS) terminal that combines a cellular radiotelephone with data processing, facsimile and data communications capabilities; a Personal Data Assistant (PDA) that includes a radiotelephone, pager, Internet/intranet access, Web browser, organizer, calendar and/or a global positioning system (GPS) receiver; a gaming device, an audio video player, and a conventional laptop and/or palmtop portable computer that includes a radiotelephone transceiver. Moreover, not all elements illustrated in FIG. 1 may be required depending on the functionality offered by the electronic device. By way of example, the speaker, microphone, transmitter, and/or receiver may not be required if the electronic device is a PDA and radiotelephone functionality is not provided. Moreover, the screen 105 and the keypad 107 and/or portions thereof may be implemented together using a touch sensitive screen.

Figure 1B:
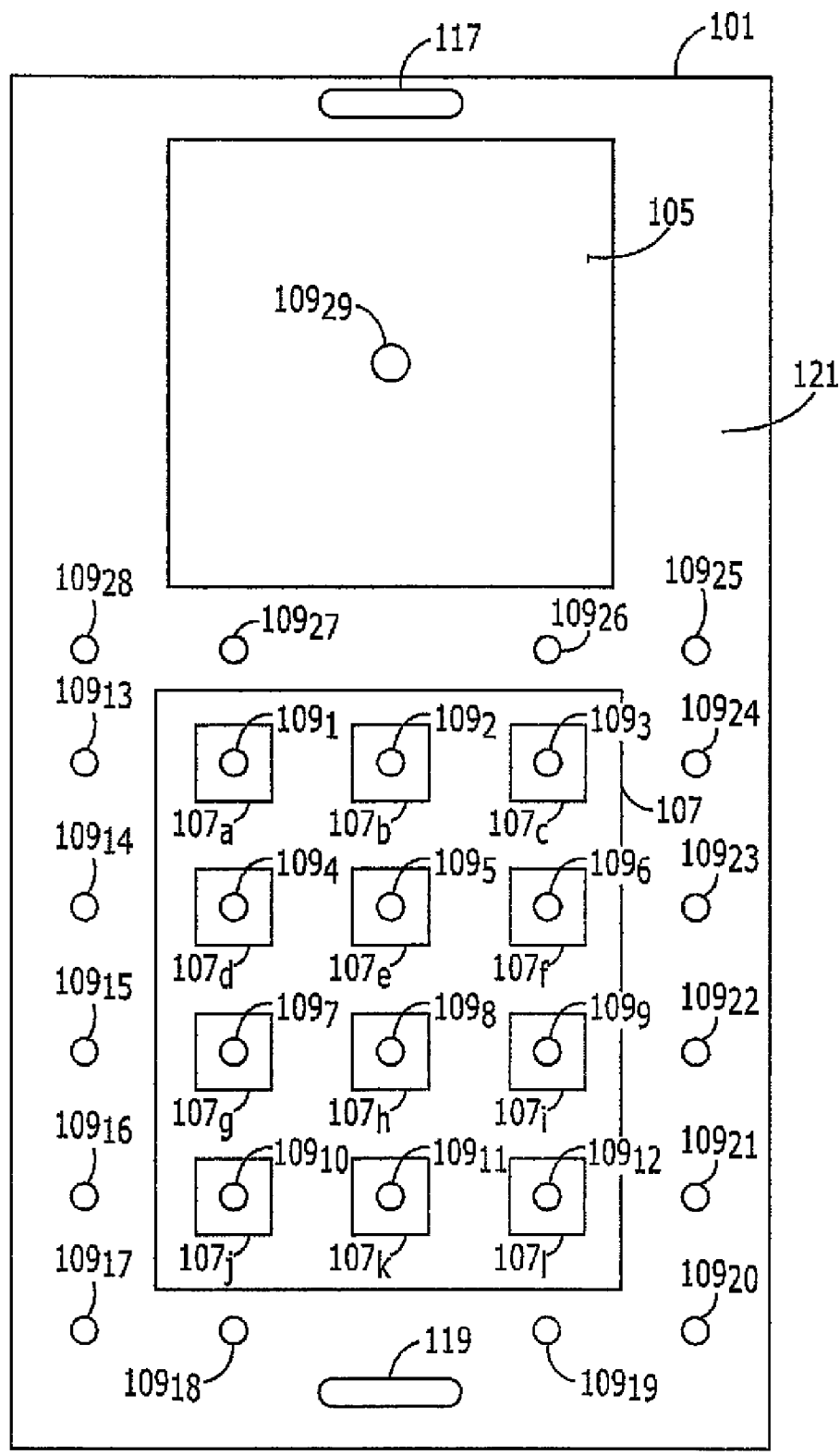
FIGS. 1B-C are front views of electronic devices according to some embodiments of the present invention.

As shown in FIG. 1B, elements of the electronic device 101 may be provided in a housing including a faceplate 121, with the screen 105 and the keypad 107 exposed and/or visible. More particularly, the keypad 107 may include a plurality of keys $107_{a-1}$ to provide, for example, a numeric keypad for the numbers 0-9 and the symbols "*" and "#". While not shown, the keypad may include additional keys such as a "send" key, an "end" key, one or more directional keys, etc. In some embodiments, portions or all of the keypad may be eliminated, for example, using a touch sensitive screen, and fewer keys may be provided than shown in FIG. 1B.

In the example of FIG. 1B, the electronic device 101 may include a plurality of light emitting diodes (LEDs) $109_{1-29}$ (illustrated as block 109 labeled lights in FIG. 1a). As shown, LEDs $109_{1-12}$ may be used to illuminate respective keys $107_{a-1}$ of keypad 107; LEDs $109_{13-28}$ may be provided as perimeter lights; and LED $109_{29}$ may be provided as a backlight for the liquid crystal display (LCD) screen 105. The keys $107_{a-1}$ may be translucent so that the LEDs $109_{1-12}$ are not directly visible but backlight illumination from each of these LEDs is visible through the respective key when the LED is turned on. Similarly, each of the perimeter LEDs may be provided behind a translucent portion of the faceplate 121. Accordingly, the perimeter LEDs may not be directly visible, but backlight illumination from each of these perimeter LEDs may be visible through the faceplate 121 when turned on. The LED $109_{29}$ may be provided behind the LCD screen 105 to provide backlight illumination for the screen.

Figure 1C:
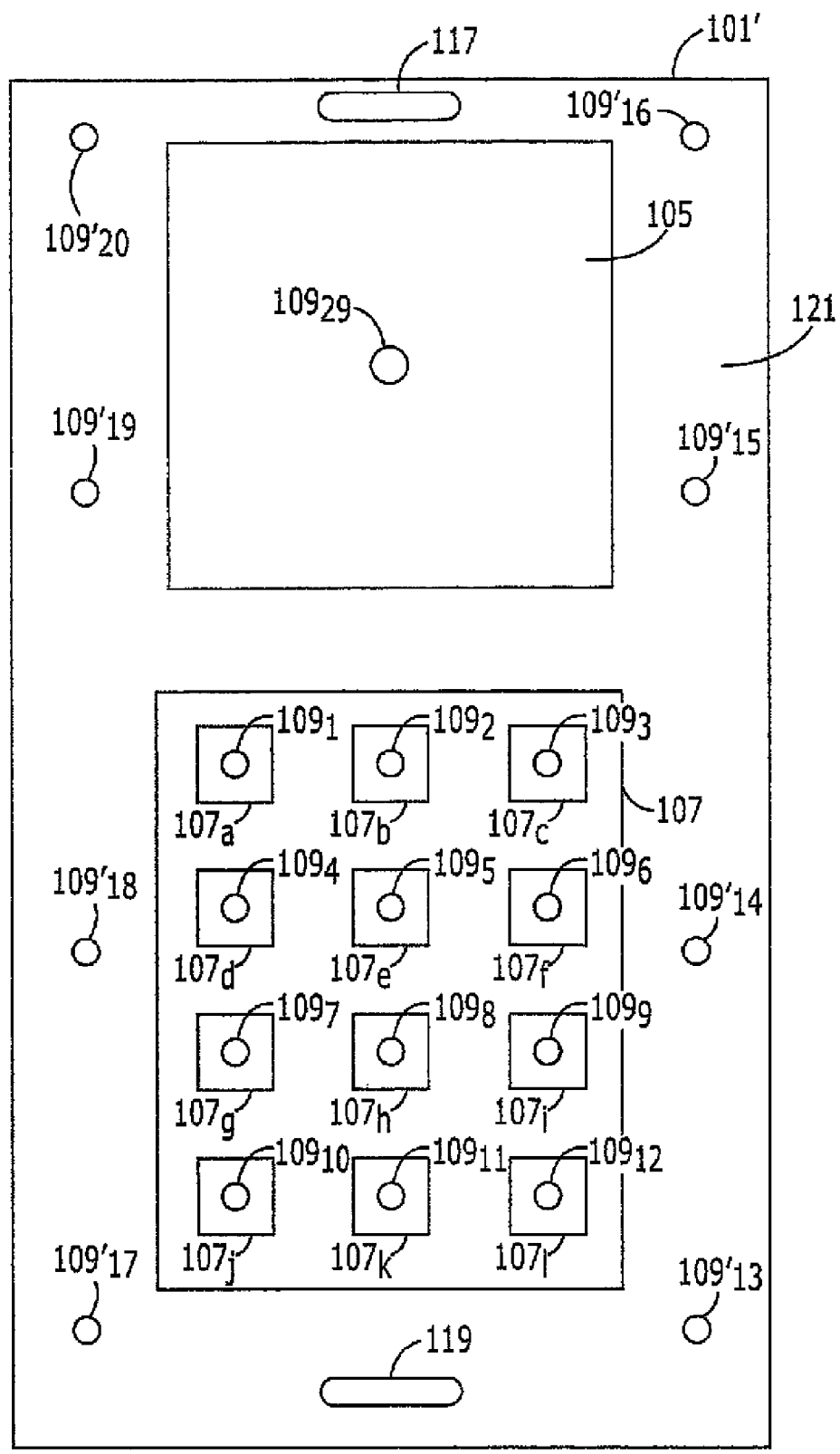

In the alternative example of FIG. 1C, the electronic device 101' may include LEDs $109_{1-12}$ provided to illuminate respective keys $107_{a-1}$ of keypad 107; LEDs $109'_{13-20}$ provided as perimeter lights; and LED $109_{29}$ provided as a backlight for the liquid crystal display (LCD) screen 105. Elements of the electronic device 101' of FIG. 1C are the same as those of the electronic device 101 of FIG. 1B with the exception that the arrangement of eight perimeter LED's $109'_{13-20}$ of FIG. 1C is different than the arrangement of sixteen perimeter LEDs $109_{13-28}$ of FIG. 1B. The keys $107_{a-1}$ may be translucent so that the LEDs $109_{1-12}$ are not directly visible but backlight illumination from each of these LEDs is visible through the respective key when the LED is turned on. Similarly, each of the perimeter LEDs $109'_{13-20}$ may be provided behind a translucent portion of the faceplate 121. Accordingly, the perimeter LEDs may not be directly visible, but backlight illumination from each of these perimeter LEDs may be visible through the faceplate 121 when turned on. The LED $109_{29}$ may be provided behind the LCD screen 105 to provide backlight illumination for the screen. While examples are illustrated with 8 and 16 perimeter lights, devices with any number of perimeter lights may be provided according to embodiments of the present invention.

The LEDs $109_{1-12}$ may thus be used to illuminate respective keys $107_{a-1}$ of keypad 107 for ease of use in the dark, and the LED $109_{29}$ may be used to provide a desired brightness for the screen 105. In addition, one or more of the LEDs $109_{1-29}$ (or $109_{1-12}$, $109'_{13-20}$, and $109'_{29}$) may be used to provide different illumination patterns associated with images displayed on the screen 105. According to some embodiments of the present invention, a graphic data file may include one or more image frames with each image frame defining an image for display on the screen 105, and the graphic data file may also include illumination instructions for the LEDs $109_{1-29}$ (or $109_{1-12}$, $109'_{13-20}$, and $109'_{29}$) with different illumination instructions associated with different frames. More particularly, the graphic data file may be provided according to the Graphics Interchange Format (GIF) standard.

As discussed above with respect to FIGS. 1A and 1B, the electronic device 101 may include a screen 105 and a plurality of lights $109_{1-29}$. Moreover, the controller 103 may provide a plurality of image frames with each image frame defining an image for display on the screen. The controller 103 may also provide illumination instructions for the plurality of LEDs $109_{1-29}$ with different illumination instructions being associated with different image frames, and each illumination instruction may define a respective illumination pattern for the plurality of lights. Images defined by the respective image frames may be displayed on the screen 105 responsive to the controller 103. Moreover, the controller 103 may provide illumination patterns for the LEDs responsive to associated illumination instructions while displaying the images on the screen 105. More particularly, a first illumination pattern provided by the LEDs while displaying a first image on the screen 105 may be different than a second illumination pattern provided by the LEDs while displaying a second image on the screen 105.

More particularly, the plurality of image frames and the illumination instructions may be provided within a graphic data file, with each image frame being provided in a different image data block of the graphic data file and with each illumination instruction being provided in an illumination data block of the graphic data file. Moreover, each illumination data block in the graphic data file may be associated with a different image data block. The graphic data file may also include a plurality of control data blocks with each of the control data blocks being associated with a respective one of the image data blocks. More particularly, each control data block may define a duration for display on the screen 105 of the image defined by the respective image data block. Each control data block may also include addition information such as a location of the image defined by the respective image data block on the screen 105.

More particularly, the graphic data file may be provided according to the Graphics Interchange Format (GIF) standard. Moreover, the graphic data file may be received over a wireless interface at receiver 115 and provided to the controller 103 from the receiver 115. For example, a graphic data file according to the GIF standard may be provided to the receiver 115 as an attachment to a Multimedia Messaging Service (MMS) message.

A plurality of image data blocks, illumination data blocks, and control data blocks may thus be provided at the controller 103 in a graphic data file (such as a GIF file). Accordingly, the images defined by the image data blocks of the graphic data file may be displayed in sequence to provide animation, and one or more of the LEDs $109_{1-29}$ may be illuminated in different patterns while displaying different images during the animation.

By way of example, different static illumination patterns of the LED's may be provided while displaying different images of a graphic data file so that at least one of the LEDs is on while displaying a first image, and so that the at least one of the LEDs is off while displaying the second image. For example, the LEDs $109_{1\text{-}28}$ may be turned on while displaying even images of a graphic data file and off while displaying odd images of the graphic data file, so that the LEDs $109_{1\text{-}28}$ alternate flashing on and off while displaying the images of the graphic data file.

In some embodiments of the present invention, an illumination pattern of the LEDs provided with an image may be dynamic so that at least two of the lights are turned on and/or off according to a sequence. A dynamic illumination pattern may be desirable when an image of a graphic data file is displayed on the screen 105 for a perceptible duration of time, such as for a slide show, for a graphic data file including a single image, and/or for a last image of an animation. More particularly, a first illumination pattern may provide that at least two of the LEDs are turned on and/or off according to a first sequence while displaying a first image, and a second illumination pattern may provide that at least two of the LEDs are turned on and/or off according to a second sequence while displaying a second image. The first and second sequences may be different. Particular static and dynamic illumination instructions and patterns are discussed in greater detail below.

A plurality of image data blocks of a graphic data file may define a plurality of images to be displayed relatively quickly to provide animation, and a plurality of illumination data blocks of the graphic data file may define a respective plurality of illumination instructions for the LEDs. Different illumination patterns of one or more of the LEDs $109_{1\text{-}29}$ may thus be synchronized with images of an animation displayed on the LCD screen 105. In some embodiments of the present invention, a plurality of images of a graphic data file may be displayed relatively slowly (either for durations defined in the graphic data file and/or until advanced by a user) to provide a slide show. In further embodiments of the present invention, a graphic data file may include a single image data block defining a single image. A graphic data file including a single image and an illumination instruction defining a dynamic illumination pattern for the LEDs may be used, for example, to provide a screen saver.

In an alternative embodiment, a graphic data file may include a plurality of image data blocks defining a plurality of images to be displayed and one illumination data block defining one set of illumination instructions for the LEDs. The LEDs may thus be turned on and/or off according to the single set of illumination instructions of the single illumination data block may while displaying each of the images. Accordingly, a particular LED may be turned on and/or off according to a same static and/or dynamic illumination instruction while displaying a sequence of different images provided using a single graphic data file. In another alternative embodiment, a graphic data file may include a single image data block defining a single image to be displayed and a plurality of illumination data blocks defining a respective plurality of sets of illumination instructions for the LEDs. The LEDs may thus be turned on and/or off according to different sets of illumination instructions of the plurality of illumination data blocks while displaying the single image. Accordingly, a particular LED may be turned on and/or off according to different static and/or dynamic illumination instructions while displaying a same image. In still another alternative embodiment, a plurality of graphic data files may each include a single image data block defining a respective image and a single illumination data block defining a respective set of illumination instructions for the LEDs.

Figure 2:
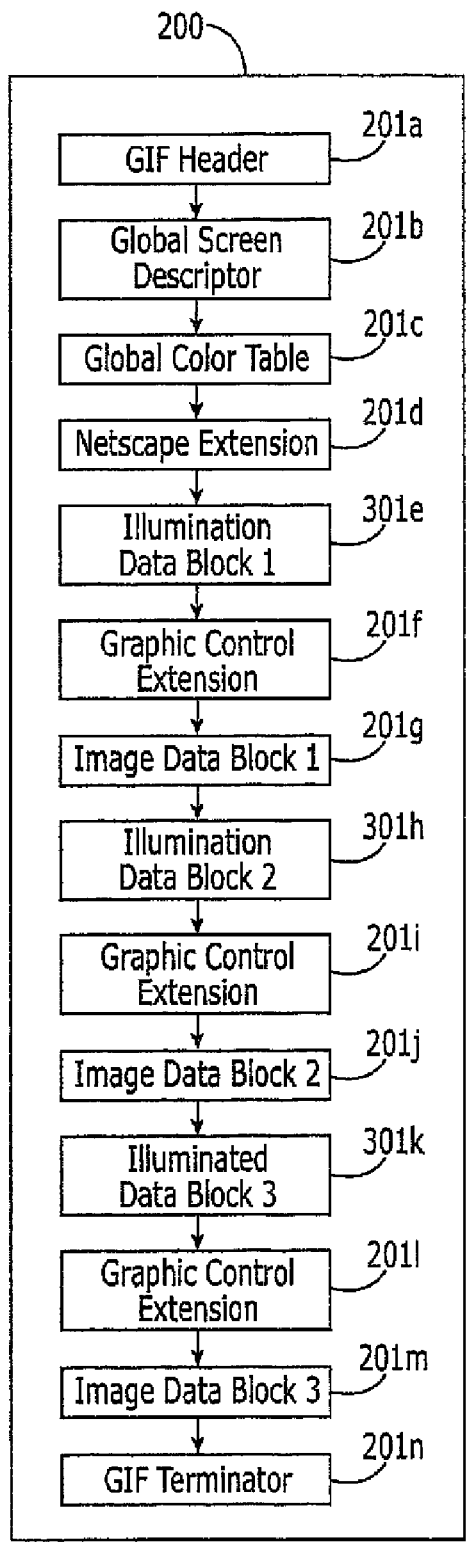
FIG. 2 is a block diagram illustrating graphic data files according to some embodiments of the present invention.

According to some embodiments of the present invention, image frames and illumination instructions may be provided in a graphic data file according to the GIF standard. By way of example, as shown in FIG. 2, a GIF data file 200 may include a plurality of blocks 201a-n including a plurality of image data blocks 201i, 201j, and 201m defining respective images to be displayed on the screen 105 in a sequential order. While three image data blocks are shown in FIG. 2, any number of image data blocks ma); be provided in a GIF data file. Moreover, control data blocks (such as graphic control extension blocks 201f, 201i, and 201l) may be provided prior to respective image data blocks, and each control data block may include information to control how an image defined by the respective image data block is displayed and to control how long the image defined by the respective image data block is displayed before displaying the image defined by the next image data block.

A beginning and ending of the GIF data file 200 may be respectively defined by the GIF header block 201a and the GIF terminator block 201n. In addition, global data blocks, such as Global Screen Descriptor data block 201b, Global Color Table data block 201c, and Netscape Extension data block 201d, may define aspects of an animation that apply to all of the image data blocks of the GIF data file.

According to the GIF89a specification, a GIF data file may also include plain text extension blocks, comment extension blocks, and application extension blocks. An application extension block may be used to provide customized application specific data to be included in a GIF data file. For example, a Netscape extension block 201d may be used to define a loop count for an animation of the GIF data file. An application extension block may include an 8-byte application identification, a 3-byte application code and 0 or more bytes of application specific data. A device that does not recognize and/or support an application extension block may display the animation of the GIF data file while ignoring the data of the unrecognized/unsupported application extension block.

According to some embodiments of the present invention, GIF application extension blocks may be defined as illumination data blocks 301e, 301h, and 301k including illumination instructions for illumination patterns for the LEDs $109_{1\text{-}28}$ to be provided while displaying images defined by the respective image data blocks 201g, 201j, and 201m. The timing information provided in the graphic control extension blocks 201f, 201i, and 201l can thus be used to define how long an image is displayed and/or how long an LED illumination pattern is provided. A sequence of LED illumination patterns can thus be synchronized with a motion of a respective sequence of images in an animation. In some embodiments of the present invention, a pre-defined sequence of LED illumination patterns may be played that is not necessarily synchronized with a motion of a respective sequence of images in an animation.

In addition, illumination data blocks may be added as application extension blocks without use of an LZW (Lemple-Ziv-Welc) compression algorithm. Moreover, it may be useful to decompress the image data blocks to display the multiple frames and allow editing of the LED illumination patterns of a sequence while displaying individual images of a GIF data file.

FIG. 3 is a diagram illustrating a format that may be provided for the illumination data blocks 301e, 301h, and 301k of FIG. 2 according to some embodiments of the present invention. More particularly, the illumination data block 301 of FIG. 3 is provided in accordance with the GIF standard. An illumination data block, for example, may include: a one byte GIF block code; a one byte extension type code; a one byte block size; an eight byte application identification (ID); a three byte authentication code; a one byte extension block size; one or more one byte illumination commands and associated one byte illumination identifiers; and a one byte block terminator.

The GIF block code may be 0x21 for a GIF extension block, the extension type code may be 0xFF for an application extension block, and the block size may be 0x0B for an eleven byte length according to the GIF standard. The application ID identifies the particular application extension, and the application ID for an illumination data block according to some embodiments of the present invention may be an alpha-numeric (e.g. ASCII) string such as "SEMC LED." The authentication code may be an alpha-numeric string, such as "1.0", used to identify a version number of the application extension block.

The extension block size may vary as a function of the number of illumination commands and associated illumination identifiers included in the illumination data block. The extension block size may identify a number of bytes in the illumination data block, and in the example of FIG. 3, the extension block size may be an even number because the total size of all fields excluding the illumination command/identifier fields is even, and because the illumination command/identifier fields are provided as pairs. The 1 byte block terminator identifies the end of the illumination data block. According to some embodiments of the present invention, an image frame defining an image may be provided in an image data block (such as $201g$, $201j$, or $201m$), and an illumination instruction associated with the image data block may be provided as one or more illumination command/identifier pairs in a corresponding image data block $301$.

For a static illumination pattern, the illumination commands of FIG. 4 define a state of an LED or group of LEDs identified using the illumination identifiers of FIG. 5A-B. More particularly, one of the illumination commands of FIG. 4 may be applied to one light or a group of lights identified using the illumination identifiers of FIG. 5A-B while displaying an associated image on a screen of the device. Illumination command 0x00 (hex) specifies that a light or lights identified by the corresponding illumination identifier are turned off while displaying an associated image, and illumination command 0x01(hex) specifies that a light or lights identified by the corresponding illumination identifier are turned on while displaying an associated image. Illumination commands 0x02 and 0x03 respectively specify that an identified light or lights fade off or on while displaying an associated image. Illumination commands 0x04 and 0x05 respectively specify that an identified light or lights flash on and then fade off or blink off and then fade on. For the fade off, fade on, flash and blink commands, a time component may also be provided. For any of the commands, intensity and/or color components may be provided for the light or lights being activated. Additional static illumination commands beyond those set forth in FIG. 4 may be provided according to additional embodiments of the present invention.

The static illumination identifiers of FIGS. 5A-B identify a particular light or particular lights to be activated in accordance with a corresponding static illumination command for some embodiments of the present invention. Illumination identifiers KEY_0 to KEY_9, KEY_STAR, and KEY_NUM, for example, may be used to identify respective ones of the LEDs $109_{1-12}$ associated with keys $107_{a-1}$ of keypad $107$. Similarly, illumination identifiers PERIPHERAL_0 to PERIPHERAL_31 may be used to identify respective ones of the perimeter LEDs $109_{13-28}$ located around a perimeter of the keypad and or around the perimeter of the device. Illumination identifiers PERIPHERAL_12 to PERIPHERAL_31 may not be supported by a device with only 12 (or fewer) perimeter LEDs so that the unsupported illumination identifiers PERIPHERAL_12 to PERIPHERAL_31 are ignored. In addition, the illumination identifier DISPLAY0 may be used to identify the LED $109_{29}$ used as a backlight for the LCD screen $105$. Moreover, the illumination identifier DISPLAY1 may be used to identify an LED used as a backlight for a secondary LCD screen, and the illumination identifier DISPLAY1 may be unsupported if the device does not include a secondary display.

Illumination identifiers KEYPAD_ROW_0 to KEYPAD_ROW_15 may be used to identify respective groups of LEDs in rows with KEYPAD_ROW_0 identifying LEDs $109_{1-3}$, with KEYPAD_ROW_1 identifying LEDs $109_{4-6}$, with KEYPAD_ROW_2 identifying LEDs $109_{7-9}$, and with KEYPAD_ROW_3 identifying LEDs $109_{10-12}$. With a device including a keypad with only 4 rows of keys, the illumination identifiers KEYPAD_ROW_4 to KEYPAD_ROW_7 may be unsupported, and illumination instructions including the unsupported row identifiers may thus be ignored.

Illumination identifiers PERIPH_1_OCLOCK to PERIPH_12_OCLOCK may control one or more peripheral lights to represent a position of an hour hand on a 12 hour clock. With reference to FIG. 1B, PERIPH_1_OCLOCK may identify perimeter LEDs $109_{24-26}$, PERIPH_2_OCLOCK may identify perimeter LEDs $109_{23-24}$, PERIPH_3_OCLOCK may identify perimeter LEDs $109_{22-23}$, PERIPH_4_OCLOCK may identify perimeter LEDs $109_{20-21}$, PERIPH_5_OCLOCK may identify perimeter LEDs $109_{19-21}$, PERIPH_6_OCLOCK may identify perimeter LEDs $109_{18-19}$, etc.

Additional illumination identifiers for additional keys and/or groups of keys (such as KEY_UP, KEY_DOWN, KEY_LEFT, KEY_RIGHT, KEY_SOFT_LEFT, KEY_SOFT_RIGHT, KEY_SOFT_CENTER, KEY_POWER, KEY_NETWORK, KEY_BACK, KEY_CLEAR, KEY_VOL_UP. KEY_VOL_DOWN, and KEY_CAMERA) may also be provided, and the illumination identifiers may be supported or ignored by a particular device depending on a configuration thereof. Additional static illumination identifiers may be provided as shown, for example, in FIGS. 5A-B, but further static illumination identifiers are not discussed herein for the sake of conciseness.

By way of example, a graphic data file $200$ (such as a GIF file) as illustrated in FIG. 2 may include three image data blocks $201g$, $201j$, and $201m$; three illumination data blocks $301e$, $301h$, and $301k$; and three graphic control extension blocks $201f$, $201i$, and $201l$. Responsive to the graphic data file $200$, the controller $103$ of device $101$ may display images and provide associated illumination patterns defined by the graphic data file. The device $101$ may display a first image defined by image data block $201g$ for a period of time defined by graphic control extension block $201f$; the device $101$ may then display a second image defined by image data block $201j$ for a period of time defined by graphic control extension block $201i$; and the device $101$ may then display a third image defined by image data block $201m$ for a period of time defined by graphic control extension block $201l$.

The first illumination data block $301e$ may include two illumination instructions with each illumination instruction including an illumination command and an illumination identifier. For example, the Turn On command (0x01) may be provided as the first illumination command, and FRONT_ROW_0 may be provided as the first illumination identifier. The Turn On command (0x01) may be provided as the second illumination command, and FRONT_ROW_2 may be provided as the second illumination identifier. Accordingly, the LEDs $109_{1-3}$ and $109_{7-9}$ are turned on while displaying the first image on the screen 105 for the period of time defined by the first graphic control extension block 201f.

The second illumination data block 301h may include four illumination instructions with each illumination instruction including an illumination command and an illumination identifier. For example, the Turn On command (0x01) may be provided as the first illumination command, and FRONT_ROW_1 may be provided as the first illumination identifier. The Turn On command (0x01) may be provided as the second illumination command, and FRONT_ROW_3 may be provided as the second illumination identifier. The Turn OFF command (0x00) may be provided as the third illumination command, and FRONT_ROW_0 may be provided as the third illumination identifier. The Turn OFF command (0x00) may be provided as the fourth illumination command, and FRONT_ROW_2 may be provided as the fourth illumination identifier. Accordingly, the LEDs $109_{4-6}$ and $109_{10-12}$ are turned on and the LEDs $109_{1-3}$ and $109_{7-9}$ are turned off while displaying the second image on the screen 105 for the period of time defined by the second graphic control extension block 201i.

The third illumination data block 301k may include four illumination instructions, with each illumination instruction including an illumination command and an illumination identifier. For example, the Turn On command (0x01) may be provided as the first illumination command, and FRONT_ROW_0 may be provided as the first illumination identifier. The Turn On command (0x01) may be provided as the second illumination command, and FRONT_ROW_2 may be provided as the second illumination identifier. The Turn OFF command (0x00) may be provided as the third illumination command, and FRONT_ROW_1 may be provided as the third illumination identifier. The Turn OFF command (0x00) may be provided as the fourth illumination command, and FRONT_ROW_3 may be provided as the fourth illumination identifier. Accordingly, the LEDs $109_{1-3}$ and $109_{7-9}$ are turned on and the LEDs $109_{4-7}$ and $109_{1-12}$ are turned off while displaying the third image on the screen 105 for the period of time defined by the second graphic control extension block 201l. Accordingly, the first and third rows of keypad LEDs may be lit while displaying the first and third images; and the second and fourth rows of LEDs may be lit while displaying the second image. A graphics data file 200 with three image data blocks is discussed by way of example herein, but graphics data files with any number of image data blocks may be provided according to embodiments of the present invention.

As discussed above with respect to FIGS. 5A-B, each illumination identifier may map to one or a plurality of LEDs provided in the device. A single LED, however, may map to a plurality of illumination identifiers. For example, the illumination identifiers PERIPHERAL_3 and KEY_TALK may identify the same LED. Moreover, a particular device may not include LEDs corresponding to all illumination identifiers provided in an illumination data block. Accordingly, such a device may execute any illumination instruction for an LED(s) included in the device, and the device may simply ignore illumination instructions for LED(s) not included in the device. In other embodiments of the present invention, a device may map an illumination identifier to a different LED if the intended LED is not included in the device. Moreover, additional and/or fewer illumination identifiers may be provided according to some embodiments of the present invention.

According to some embodiments of the present invention, KEY_0 to KEY_9 and KEY_STAR and KEY_NUM illumination identifiers may be provided, but a particular device may include a single LED for each row of keys of keypad 107 or separate LEDs for a row of keys may not be separately controllable. Accordingly, the device may ignore illumination instructions directed to individual LEDs if the particular individual LEDs are not separately provided and/or controllable, and only illumination instructions including the row identifiers KEYPAD_ROW_0 to KEYPAD_ROW_3 may be recognized with respect to LEDs for the keypad. In other embodiments of the present invention, such a device may illuminate all LEDs of a row in response to an illumination instruction including an illumination identifier for that row or if an illumination instruction includes a illumination identifier for any LED of that row.

In addition, illumination identifiers may be provided that do not map directly to particular LEDs, but instead map to a more general category of LEDs that may be interpreted differently by different devices. For example, illumination identifiers may define general orientations of perimeter LEDs defined, for example, as clock orientations PERIPHER_1_OCLOCK to PERIPH_12_OCLOCK. With sixteen perimeter LEDs $109_{13-28}$ illustrated in the device 101 of FIG. 1B, for example, PERIPHER_12_OCLOCK may map to LEDs $109_{26-27}$, PERIPHER_1_OCLOCK may map to LEDs $109_{24-26}$, PERIPHER_2_OCLOCK may map to LEDs $109_{23-25}$, PERIPHER_3_OCLOCK may map to LEDs $109_{22-23}$, PERIPHER_4_OCLOCK may map to LEDs $109_{20-22}$, PERIPHER_5_OCLOCK may map to LEDs $109_{19-21}$, PERIPHER_6_OCLOCK may map to LEDs $109_{18-19}$, etc. A different device with a different number and/or placement of perimeter LEDs, however, may map clock orientations PERIPHER_1_OCLOCK to PERIPHER_12_OCLOCK differently. With eight perimeter LEDs $109'_{13-20}$ illustrated in the device 101' of FIG. 1C, for example, PERIPHER_12_OCLOCK may map to LEDs $109_{16}$ and $109_{20}$, PERIPHER_1_OCLOCK may map to LED $109'_{16}$, PERIPHER_2_OCLOCK may map to LEDs $109'_{15-16}$, PERIPHER_3_OCLOCK may map to LED $109'_{15}$, PERIPHER_4_OCLOCK may map to LED $109'_{14}$, PERIPHER_5_OCLOCK may map to LED $109_{13}$, PERIPHER_6_OCLOCK may map to LEDs $109'_{13}$ and $109'_{17}$, PERIPHER_7_OCLOCK may map to LED $109'_{17}$, PERIPHERAL_8_OCLOCK may map to LED $109'_{18}$, PERIPHERAL_9_OCLOCK may map to LED $109'_{19}$, PERIPHERAL_10_OCLOCK may map to LEDs $109'_{19-20}$, and PERIPHERAL_11_OCLOCK may map to LED $109'_{20}$.

By identifying perimeter LEDs using a 12 hour clock (instead of identifying individual LEDs), illumination sequences may be displayed in a similar fashion on phones that have different numbers of perimeter LEDs. For example, a phone with 24 perimeter LEDs may associate two LEDs with each hour; a phone with 12 perimeter LEDs may associate one LED with each hour; and a phone with 8 perimeter LEDs could associate 1 or 2 LEDs with each hour as discussed above with respect to FIG. 1C. An illumination sequence that turns on and off the perimeter LEDs at successive "hour" positions and proceeds in a clockwise fashion, for example, may thus provide a similar appearance on different phones having different numbers of perimeter LEDs. Content can thus be developed and reused across different models of phones.

For dynamic illumination patterns, each of the dynamic illumination commands of FIG. 6 defines a sequence to be applied using a dynamic illumination pattern defined using dynamic illumination identifiers of FIG. 7. The dynamic illumination commands of FIG. 6 and the dynamic illumination identifiers of FIG. 7 may be provided in an illumination data block 301 as discussed above with respect to FIGS. 2 and 3.

With reference to FIG. 6, a loop command 0x00 may provide that a dynamic illumination pattern is repeated for a period of time defined by the corresponding graphic control extension block. In an alternative, a play command 0x11 to 0x1N may provide that a dynamic illumination pattern is repeated a defined number of times from one time (0x11) to N times (0x1N). With a one byte illumination command, the play commands defined in FIG. 6 may provide that an illumination pattern is repeated, for example, up to 15 times (0x1F).

The dynamic illumination identifiers of FIG. 7 define particular illumination patterns that may be provided while displaying a corresponding image and repeated while displaying the corresponding image according to a dynamic illumination command of FIG. 6. For example, the SEQ_RING_AROUND_ROSIE (0x00) illumination identifier may indicate that the perimeter LEDs $109_{26-27}$ are sequentially turned on and then off to create the appearance of a single light moving around the keypad. The SEQ_NIGHT_RIDER (0x01) illumination identifier may indicate that LEDs of the vertical columns of perimeter LEDs (i.e. LEDs $109_{17-13}$ and $109_{28}$ and LEDs $109_{20-25}$) are sequentially turned on and off to create the appearance of a first light moving up and down one side of the keypad and a second light moving up and down a second side of the keypad.

The SEQ_ALL_FLASH (0x02) illumination identifier may indicate that all perimeter LEDs $109_{13-28}$ flash on and off at the same time. The SEQ_RANDOM (0x03) illumination identifier may indicate that the LEDs $109_{1-28}$ flash randomly. The SEQ_RANDOM-FADE (0x04) illumination identifier may indicate that the LEDs $109_{1-28}$ fade randomly. The SEQ_EQUALIZER (0x05) illumination identifier may indicate that the LEDs $109_{1-12}$ are illuminated as columns of randomly increasing and decreasing height to create the appearance of an audio equalizer with bouncing columns of light. The SEQ_EVEN_ODD (0x06) illumination identifier may indicate that even and odd ones of the LEDs $109_{1-28}$ alternately flash on and off. The SEQ_WINK_AROUND (0x07) illumination identifier may indicate that all but one of the perimeter LEDs $109_{13-28}$ is turned on and that each of the perimeter LEDs is sequentially turned off then on to create the appearance of a dark spot moving around the perimeter of the keypad. The SEQ_LANDING_STRIP (0x08) illumination identifier may create the appearance of a landing strip with an appearance of two lights moving down the edges of the device. The SEQ_HEARTBEAT (0x09) illumination identifier may indicate that all LEDs are illuminated together two times quickly followed by a delay. The SEQ_SOS (0x0A) illumination identifier may indicate that all LEDs are turned on and off together in a pattern to mimic a pattern of SOS in Morse code. The SEQ_ALT_LEFT_RIGHT (0x0B) illumination identifier may indicate that LEDs on left and right sides of the device are alternatingly turned on and off. The SEQ_ALL_ON (0x0C) illumination identifier may indicate that all LEDs are turned on with no "motion," and the SEQ_ALL_OFF (0x0D) illumination identifier may indicate that all LEDs are turned off with no "motion."

Additional dynamic illumination identifiers (such as 0x0E to 0x7F) may be reserved for pre-defined standard sequences. In addition, dynamic illumination identifiers (such as 0x80 to 0xFF) may be reserved for device specific sequences.

The illumination commands and identifiers of FIGS. 4-7 are provided by way of example and additional and/or different commands and/or identifiers may be provided according to some embodiments of the present invention. Moreover, a device according to some embodiments of the present invention may be configured to execute illumination commands and identifiers supported by the device and to translate or ignore illuminations commands and identifiers not supported by the device.

According to some embodiments of the present invention, the electronic device 101 may be a radiotelephone, and graphic data files including illumination instructions may be wirelessly downloaded from a network operator or other source to be used as an alert, notification, and/or entertainment. For example, a particular graphic data file may be downloaded using a multimedia messaging service (MMS) message, and the graphic data file may be executed to notify a user of an incoming telephone call, of a missed call, of an e-mail or other message, etc. More particularly, a particular graphic data file including illumination instructions may be executed together with or instead of a ring or other incoming call notification.

Moreover, different graphic data files including different illumination instructions may be associated with different known telephone numbers so that a different graphic data files may be executed to provide unique incoming telephone call notifications for different callers using available caller identification information. In addition, if a screen is turned off (such as when a flip-type radiotelephone is closed), a graphic data file including illumination instructions may be executed with only the LED illumination pattern (and not images) being visible. In other embodiments of the present invention, images may be provided on a secondary screen if a primary screen is turned off and/or closed. In yet further embodiments of the present invention, a graphic data file may include blank image data blocks and associated illumination instructions so that a blank screen is provided while providing an LED illumination pattern.

In the drawings and specification, there have been disclosed typical preferred embodiments of the invention and, although specific terms are employed, they are used in a generic and descriptive sense only and not for purposes of limitation, the scope of the invention being set forth in the following claims. As used herein, the term "comprising" or "comprises" is open-ended, and includes one or more stated elements, steps, and/or functions. More particularly, it should be emphasized that the term "comprises/comprising" when used in this specification is taken to specify the presence of stated features, integers, steps or components but does not preclude the presence or addition of one or more other features, integers, steps, components or groups thereof.

That which is claimed is:

1. A method of operating an electronic device including a screen and a plurality of lights, the method comprising:
providing a plurality of image frames with each image frame defining an image for display on the screen;
providing illumination instructions for the plurality of lights wherein different illumination instructions are associated with different image frames and wherein each illumination instruction defines a respective illumination pattern for the plurality of lights;
displaying the images defined by the respective image frames on the screen; and
while displaying a first image defined by a first image frame on the screen, providing a first illumination pattern for the plurality of lights, wherein the first illumination pattern is defined by a first illumination instruction associated with the first image frame; and
while displaying a second image defined by a second image frame on the screen, providing a second illumination pattern for the plurality of lights, wherein the second illumination pattern is defined by a second illumination instruction associated with the second image frame.

2. A method according to claim 1 wherein providing the plurality of image frames and providing the illumination instructions includes providing a graphic data file including the plurality of image frames and the associated illumination instructions.

3. A method according to claim 2 wherein each image frame is provided as a different image data block of the graphic data file and wherein each illumination instruction is provided as an illumination data block of the graphic data file with each illumination data block being associated with a different image data block.

4. A method according to claim 3 wherein providing the graphic data file further comprises providing a plurality of control data blocks with each of the control data blocks being associated with a respective one of the image data blocks and defining a duration for display of the image defined by the respective image data block.

5. A method according to claim 2 wherein providing the graphic data file comprises providing the graphic data file according to a Graphics Interchange Format (GIF) standard.

6. A method according to claim 2 wherein each of the plurality of lights is separate from the screen.

7. A method according to claim 1 wherein providing the plurality of image frames and providing the plurality of illumination instructions comprises:
providing a first graphic data file including a first image frame and a first illumination instruction; and
providing a second graphic data file including a second image frame and a second illumination instruction.

8. A method according to claim 1 wherein the screen comprises a liquid crystal display, and wherein the plurality of lights comprises a plurality of light emitting diodes.

9. A method according to claim 8 wherein the plurality of lights comprises at least one of a backlight for a keypad, a peripheral light outside a keypad, and/or a backlight for the liquid crystal display.

10. A method according to claim 1 wherein the images are displayed in a sequence to provide animation.

11. A method according to claim 1 wherein with the first illumination pattern at least one of the lights is on while displaying the first image, and wherein with the second illumination pattern the at least one of the lights is off while displaying the second image.

12. A method according to claim 1 wherein with the first illumination pattern at least two of the lights are turned on and/or off according to a first sequence while displaying the first image, wherein with the second illumination pattern at least two of the lights are turned on and/or off according to a second sequence while displaying the second image, and wherein the first and second sequences are different.

13. A method according to claim 1 wherein providing the plurality of image frames comprises receiving the plurality of image frames over a wireless interface, and wherein providing the illumination instructions comprises receiving the illumination instructions over the wireless interface.

14. An electronic device comprising:
a screen;
a plurality of lights;
a memory configured to provide a plurality of image frames with each image frame defining an image for display on the screen, and to provide illumination instructions for the plurality of lights wherein different illumination instructions are associated with different image frames and wherein each illumination instruction defines a respective illumination pattern for the plurality of lights; and
a processor coupled to the screen, to the plurality of lights, and to the memory, the processor being configured to display the images defined by the respective image frames on the screen, and while displaying a first image defined by a first image frame on the screen, to provide a first illumination pattern for the plurality of lights with the first illumination pattern being defined by a first illumination instruction associated with the first image frame, and while displaying a second image defined by a second image frame on the screen, to provide a second illumination pattern for the plurality of lights with the second illumination pattern being defined by a second illumination instruction associated with the second image frame.

15. An electronic device according to claim 14 wherein the memory is configured to provide a graphic data file including the plurality of image frames and the associated illumination instructions.

16. An electronic device according to claim 15 wherein each image frame is provided as a different image data block of the graphic data file and wherein each illumination instruction is provided as an illumination data block of the graphic data file with each illumination data block being associated with a different image data block.

17. An electronic device according to claim 16 wherein the graphic data file includes a plurality of control data blocks with each of the control data blocks being associated with a respective one of the image data blocks and defining a duration for display of the image defined by the respective image data block.

18. An electronic device according to claim 15 wherein the graphic data file is provided according to a Graphics Interchange Format (GIF) standard.

19. An electronic device according to claim 15 wherein each of the plurality of lights is separate from the screen.

20. An electronic device according to claim 14 wherein the memory is configured to provide a first graphic data file including a first image frame and a first illumination instruction, and to provide a second graphic data file including a second image frame and a second illumination instruction.

21. An electronic device according to claim 14 wherein the screen comprises a liquid crystal display, and wherein the plurality of lights comprises a plurality of light emitting diodes.

22. An electronic device according to claim 21 wherein the plurality of lights comprises at least one of a backlight for a keypad, a peripheral light outside a keypad, and/or a backlight for the liquid crystal display.

23. An electronic device according to claim 14 wherein the processor is configured to display the images in a sequence to provide animation.

24. An electronic device according to claim 14 wherein with the first illumination pattern at least one of the lights is on while displaying the first image, and wherein with the second illumination pattern the at least one of the lights is off while displaying the second image.

25. An electronic device according to claim 14 wherein with the first illumination pattern at least two of the lights are turned on and/or off according to a first sequence while displaying the first image, wherein with the second illumination pattern at least two of the lights are turned on and/or off according to a second sequence while displaying the second image, and wherein the first and second sequences are different.

26. An electronic device according to claim 14 further comprising:
a receiver coupled to the processor and/or the memory wherein the receiver is configured to receive the plurality of image frames and the illumination instructions over a wireless interface and to provide the plurality of image frames and the illumination instructions to the processor and/or the memory.

27. A computer program product for operating an electronic device including a screen and a plurality of lights, the computer program product comprising a computer readable storage medium having computer readable program code embodied therein, wherein the computer readable storage medium comprises an electronic medium, a magnetic medium, an optical medium, an electromagnetic medium, an infrared medium, or a semiconductor medium, the computer readable program code comprising:
computer readable program code configured to provide a plurality of image frames with each image frame defining an image for display on the screen;
computer readable program code configured to provide illumination instructions for the plurality of lights wherein different illumination instructions are associated with different image frames and wherein each illumination instruction defines a respective illumination pattern for the plurality of lights;
computer readable program code configured to display the images defined by the respective image frames on the screen;
computer readable program code configured to provide a first illumination pattern for the plurality of lights while displaying a first image defined by a first image frame on the screen, wherein the first illumination pattern is defined by a first illumination instruction associated with the first image frame; and
computer readable program code configured to provide a second illumination pattern for the plurality of lights while displaying a second image defined by a second image frame on the screen, wherein the second illumination pattern is defined by a second illumination instruction associated with the second image frame.

28. A computer program product according to claim 27 wherein the computer readable program code configured to provide a plurality of image frames and the computer readable program code configured to provide illumination instructions together comprise:
computer readable program code configured to provide a graphic data file including the plurality of image frames and the associated illumination instructions.

29. A computer program product according to claim 28 wherein each image frame is provided as a different image data block of the graphic data file and wherein each illumination instruction is provided as an illumination data block of the graphic data file with each illumination data block being associated with a different image data block.

30. A computer program product according to claim 29 wherein the computer readable program code configured to provide the graphic data file is further configured to provide a plurality of control data blocks with each of the control data blocks being associated with a respective one of the image data blocks and defining a duration for display of the image defined by the respective image data block.

31. A computer program product according to claim 28 wherein the computer readable program code configured to provide the graphic data file is further configured to provide the graphic data file according to a Graphics Interchange Format (GIF) standard.

32. A computer program product according to claim 28 wherein each of the plurality of lights is separate from the screen.

33. A computer program product according to claim 27 wherein the images are displayed in a sequence to provide animation.

34. A computer program product according to claim 27 wherein the computer readable storage medium comprises a computer diskette, a random access memory, a read-only memory, an erasable programmable read-only memory, or a compact disk.

* * * * *

UNITED STATES PATENT AND TRADEMARK OFFICE
CERTIFICATE OF CORRECTION

| | | |
|---|---|---|
| PATENT NO. | : 8,035,585 B2 | |
| APPLICATION NO. | : 11/016073 | |
| DATED | : October 11, 2011 | |
| INVENTOR(S) | : Nichols et al. | |

It is certified that error appears in the above-identified patent and that said Letters Patent is hereby corrected as shown below:

In the Patent:
Column 10, Line 2: Please correct "blocks 201i" to read -- blocks 201g --
Line 5: Please correct "blocks ma);" to read -- blocks may --

Column 15, Line 30: Please correct "RANDOM-FADE" to read -- RANDOM_FADE --

Signed and Sealed this
Twenty-fourth Day of April, 2012

David J. Kappos
*Director of the United States Patent and Trademark Office*